(12) United States Patent
Chaduc et al.

(10) Patent No.: US 8,684,314 B2
(45) Date of Patent: Apr. 1, 2014

(54) EMERGENCY PILOTING BY MEANS OF A SERIES ACTUATOR FOR A MANUAL FLIGHT CONTROL SYSTEM IN AN AIRCRAFT

(75) Inventors: Bruno Chaduc, Eguilles (FR); Patrick Hellio, Bouc bel Air (FR); Bernard Gemmati, Lauris (FR); Karsten Krok, Freising (DE)

(73) Assignees: Airbus Helicopters, Marignane Cedex (FR); Airbus Helicopter Deutschland GmbH, Donawoeth (DE)

( * ) Notice: Subject to any disclaimer, the term of this patent is extended or adjusted under 35 U.S.C. 154(b) by 185 days.

(21) Appl. No.: 13/417,667

(22) Filed: Mar. 12, 2012

(65) Prior Publication Data

US 2012/0241563 A1    Sep. 27, 2012

(30) Foreign Application Priority Data

Mar. 25, 2011    (EP) .................................. 11290147

(51) Int. Cl.
*G05D 1/00*    (2006.01)
(52) U.S. Cl.
USPC ...................... 244/196; 244/17.13; 244/99.4
(58) Field of Classification Search
USPC ............... 244/194–197, 17.11, 17.13, 17.19, 244/17.21, 220, 99.2, 99.4, 221
See application file for complete search history.

(56) References Cited

U.S. PATENT DOCUMENTS

| 4,170,147 | A | 10/1979 | Durno |
| 4,492,907 | A | 1/1985 | Fabian |
| 4,529,155 | A | 7/1985 | Bramwell |
| 6,913,226 | B2 * | 7/2005 | Huynh .......................... 244/75.1 |
| 6,929,222 | B2 * | 8/2005 | Djuric ............................ 244/220 |
| 7,229,046 | B2 | 6/2007 | DuRant |
| 7,764,035 | B2 | 7/2010 | Kirchhofer |
| 7,969,110 | B2 | 6/2011 | Vincent |
| 8,196,857 | B2 | 6/2012 | Gemmati |
| 8,197,212 | B2 | 6/2012 | Garcin |
| 2004/0200928 | A1 | 10/2004 | Degenholtz |
| 2010/0072322 | A1 | 3/2010 | Boczar |
| 2011/0031346 | A1 | 2/2011 | Allieta |
| 2011/0121126 | A1 * | 5/2011 | Mercer et al. .............. 244/17.13 |

FOREIGN PATENT DOCUMENTS

| FR | 2407130 A1 | 5/1979 |
| FR | 2912375 A1 | 8/2008 |
| FR | 2920744 A1 | 3/2009 |
| FR | 2931132 A1 | 11/2009 |
| FR | 2946317 A1 | 12/2010 |
| FR | 2946620 A1 | 12/2010 |

OTHER PUBLICATIONS

Search Report and Written Opinion; Application No. EP 11290147; dated Aug. 22, 2011.

* cited by examiner

*Primary Examiner* — Timothy D Collins
*Assistant Examiner* — Jamie S Stehle
(74) *Attorney, Agent, or Firm* — Brooks Kushman P.C.

(57) ABSTRACT

For emergency piloting of a manual flight control system (7) of an aircraft (1), in the event of flexible connection means (26) breaking, an upstream control device (8) takes authority over the electronic control unit (29) of series actuator (21). An output pivoting quadrant (25) is subjected by a centering rod (22) to a blocking and centering action. In the event of the system breaking, the output pivoting quadrant (25) forms a bearing point for the series actuator (21), so that an emergency control actuate a airfoil surface (11).

17 Claims, 2 Drawing Sheets

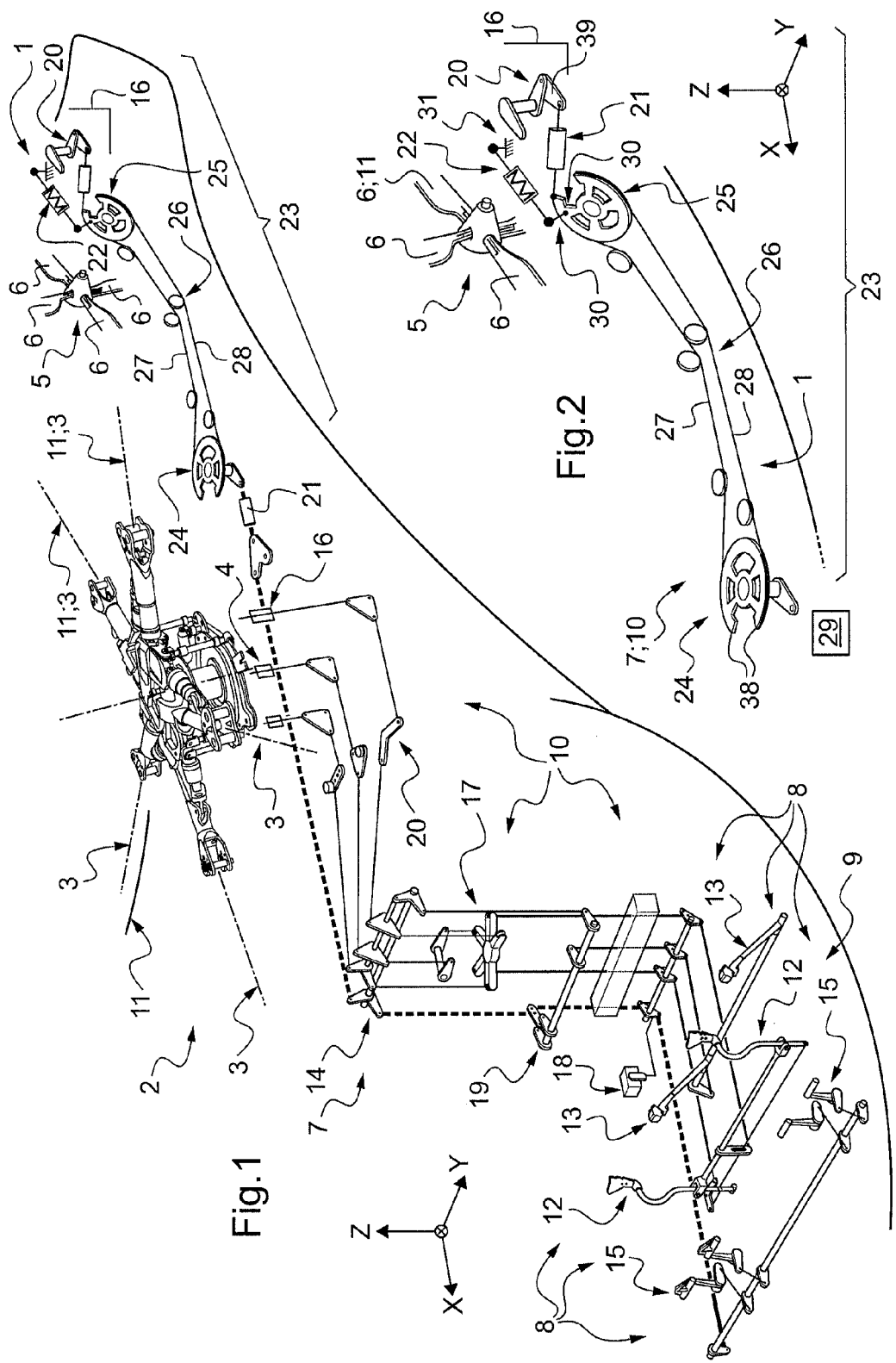

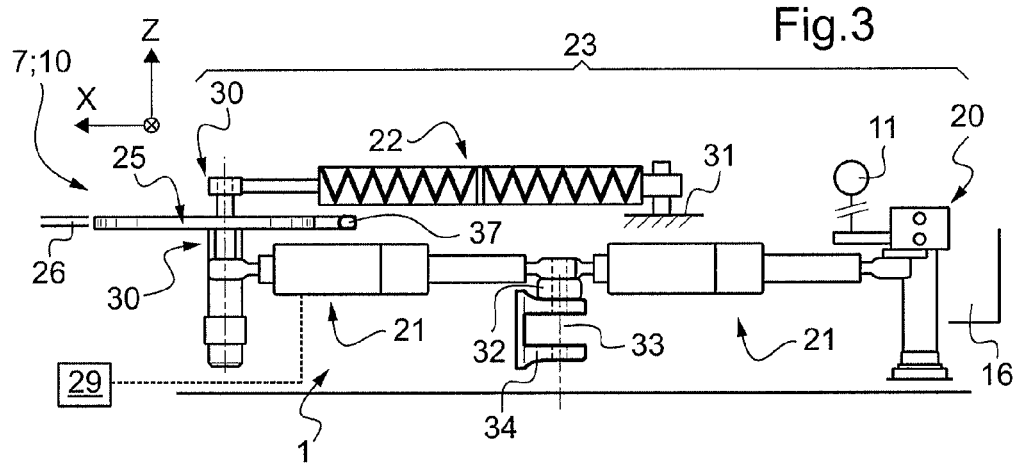
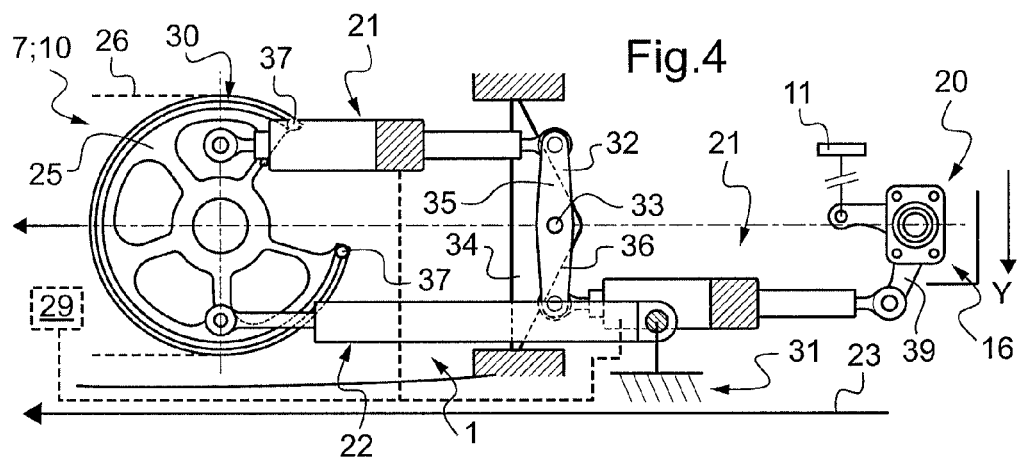
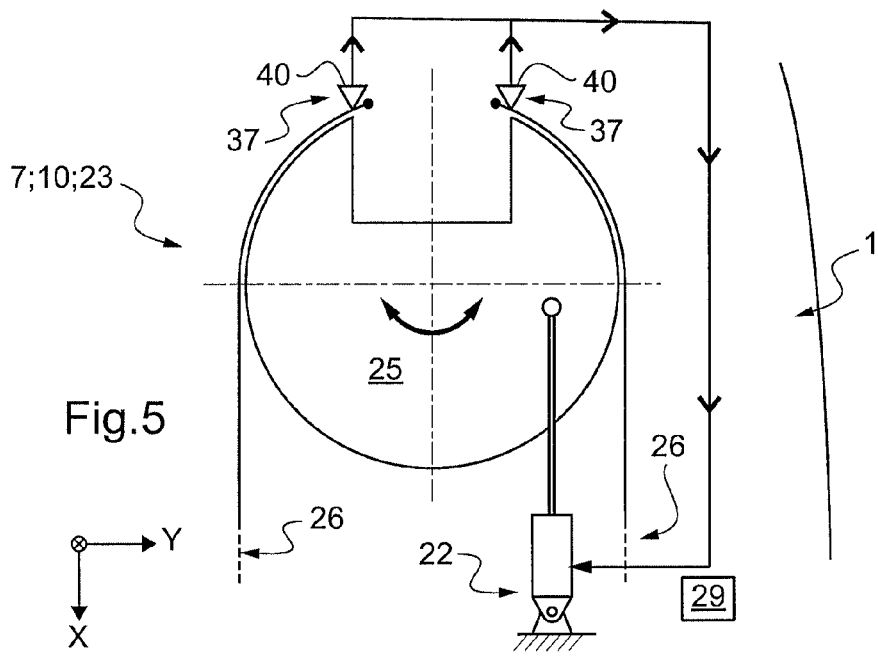

EMERGENCY PILOTING BY MEANS OF A SERIES ACTUATOR FOR A MANUAL FLIGHT CONTROL SYSTEM IN AN AIRCRAFT

CROSS REFERENCE TO RELATED APPLICATIONS

This application claims priority to EP 11 290147.5 filed on Mar. 25, 2011, the disclosure of which is incorporated in its entirety by reference herein.

BACKGROUND OF THE INVENTION (1) Field of the Invention

The present invention relates to the field of the emergency piloting of aircraft.

(2) Description of Related Art

Emergency piloting means the pilot maintaining a certain amount of authority over changes in the attitude of the aircraft in the event of one or more of the manual flight control systems that are provided for controlling such changes of attitude in normal operation not operating normally.

Without this being a limitation, the invention is described in its applications to rotary wing aircraft, such as helicopters and other rotorcraft or hybrid craft. The invention also applies to other aircraft having so-called "fixed" wings (airplanes, gliders, or the like).

The flight control systems concerned by the invention are "manual". Consequently, in order to obtain a change in the flight attitude of the aircraft in normal operation, the pilot acts on a control device (e.g. a stick, a lever, or a pedal—cf. below) that forms part of one or more manual flight control systems, and acts thereon.

These manual flight control systems include one or more airfoil surfaces such as the blades of one or more rotors and/or other surfaces (wings, flaps, fins, stabilizers, rudders, etc.) and they are designed to control the actions thereof. It is these airfoil surfaces themselves that actually generate the changes in attitude of the aircraft.

Specifically, a manual flight control system transmits authority from the pilot for changing the flight attitude of the aircraft in roll, in pitching, or in yaw.

Naturally, the term "manual" should not be taken in its literal meaning. It is used specifically to distinguish between a flight control system operated by a human and an automatic control system (e.g. an autopilot or automatic flight control system (AFCS)). Specifically, a control device such as the mechanical system for controlling yaw, which is usually actuated by the feet acting on pedals, should also be considered as a "manual" flight control system.

Although a flight control system is said to be "manual", it may also include power assistance, in order to help the pilot move the manual control device against external reaction forces from the airfoil surfaces.

It is not uncommon for a manual flight control system also to restore a certain amount of "feel" to the pilot representative of these reaction forces, by applying forces to the manual control devices. The term "haptic" or "TRIM" is used to describe such feedback that acts relative to the trim of the control system.

For transmitting movements from upstream to downstream, a manual flight control system thus comprises at least one manual flight control device (at the upstream end), intermediate mechanical connections referred to as "linkages" for transmitting control, and at the downstream end an airfoil surface such as a rotary wing (e.g. rotor blades).

In order to illustrate the description of manual flight control systems, reference is made to a conventional helicopter.

In general, a manual flight control system known as the "cyclic pitch" system acts on the cyclic pitch of the blades of the main rotor so as to cause a change in flight attitude in roll and in pitching, by actuating a corresponding manual flight control device known as the "cyclic stick".

Another manual flight control system known as the "collective pitch" system acts on the collective pitch of the blades in order to give rise to a vertical change in flight attitude (i.e. a change in altitude) of the aircraft, by acting on a corresponding manual flight control device known as the "collective pitch" lever or the "collective" lever.

Yet another manual flight control system is dedicated to changing flight attitude in yaw, and it is actuated by the pilot using a flight control device in the form of pedals.

It should be observed that a mixer enables collective pitch controls and cyclic pitch controls to operate independently of each other and without mutual interaction.

By way of example, in a heavy helicopter, a manual flight control system often includes a phasing unit; and in a helicopter having a "tail" anti-torque rotor, the yaw manual flight control system comprises not only pedals (control device) and primary and secondary (yaw) linkages, but also means for coupling collective pitch and yaw, and also a mixer.

These manual flight control systems are thus relatively long and heavy, in particular for transmitting movements to control changes of attitude in yaw.

Such systems generate friction forces that can be considerable, particularly when the systems are long and/or complex (i.e. include numerous components).

In theory, these forces could lead to electrical flight controls being used, as described in documents US 2004/200928 or U.S. Pat. No. 7,229,046. Nevertheless, such electrical flight controls are difficult to implement in practice. In particular on existing aircraft they give rise to modifications that are extensive and expensive.

Faced with this difficulty, a practical solution is to provide hydraulic or pneumatic power assistance in the manual flight control system.

Other documents are mentioned below that warrant being considered in association with the invention.

In order to provide versatile piloting assistance, document FR 2 946 620 describes a movement transmission system in which an additional force is generated using piloting assistance means that are mechanically associated with said system, and that operate as a function of the position of the flight control and of an instantaneous force as measured on the movement transmission system. Autopilot means can control the piloting assistance in order to make it perform the functions of existing dampers and parallel actuators so as to enable it to take the place of the parallel actuators, the dampers, and the hydraulic unit that would conventionally be used. The piloting assistance may optionally include at least one series actuator arranged between the rotor and the connection means.

Document FR 2 931 132 describes assisted flight controls for a rotorcraft. A control member such as a stick is connected to crank means including an incorporated motor having a drive rotor and a stator, the motor assisting flight control movements as a function of measurements from piloting movement sensors.

Document FR 2 407 130 describes redundant flight control for a helicopter, having flexible cables making it possible to selectively position a desired flight quadrant. Short balancing springs are used for putting the quadrant in a preselected position in the event of the cables breaking.

Document FR 2 912 375 describes an example of a "series" actuator, specifically a smart electromechanical actuator (SEMA). That actuator comprises a rotary electric motor, position sensors, and a servo-control circuit connected to the two position sensors and to the motor in order to deliver a motor power signal that varies as a function of a position setpoint signal and as a function of the signals delivered by the two position sensors. Redundant modules calculate a position as a function of the two sensors, under mutual monitoring of the results delivered by those calculation modules, in order to produce a fault detection signal.

Document FR 2 920 744 describes an electric compensation actuator for actuating the controls of a rotorcraft. An autopilot system transmits control signals to electric actuators connected in series within the flight controls. A compensation actuator is also fitted to the controls, in particular the pitching and roll controls, in order to maintain an anchor point (or "middle" point) for the manual control device (in particular the "cyclic stick"). The compensation actuator comprises an (auto)synchronous rotary motor and reversible speed-reducing gearing. A motor control circuit varies the gear ratio of reduction stages, as a function of an applied position setpoint.

Document FR 2 946 317 describes a crank for a manual flight control device of a rotary wing aircraft that serves to apply variable gain to a system for transmitting movement and in order to change flight attitude.

Document U.S. Pat. No. 4,492,907 describes a yaw control system for a helicopter, with a connection system having hydraulic power assistance and two servo-controls acting in parallel with the connection system while in automatic flight mode. A position servo-control circuit includes a circuit for controlling the position of the member that is driven by a series servo-motor, and that may in particular be measured by means of a potentiometer.

Document U.S. Pat. No. 4,529,155 describes a flight control system for a helicopter with semicircular quadrants and floating end fittings each having a flexible cable anchored thereon. Those floating end fittings are biased by springs to accommodate the event of a cable separating. In the event of the opposite cable breaking, the springs perform a centering action.

Document US 2010/072322 describes a pedal system for yaw piloting with little movement. In order to act on an anti-torque rotor, there are provided the pedal system, a servo-control, and interposed control logic.

Although they are of interest, those documents are in practice poorly adapted to the very particular context of emergency piloting in the event of a break in a flight control of a rotary wing aircraft, e.g. a helicopter.

In this context, the invention seeks to solve the following technical problems, in particular.

For obvious reasons of safety in aviation, various solutions have been proposed to mitigate a breakage of the flight controls of an aircraft. Such a breakage within a manual flight control system could lead to the aircraft being lost.

For example, a manual flight control system for controlling a helicopter in yaw is known that is fitted with a spring-loaded centering rod, as is to be found in particular on the following Eurocopter helicopters: EC330, EC332, and EC225.

Such a spring and centering rod system presents functions that are comparable to the subject matter of document U.S. Pat. No. 4,529,155. By imposing mechanical equilibrium, the system makes it possible to "freeze" the position of the airfoil surface that acts like a rudder (i.e. the anti-torque rotor in the yaw system), in a position that is predetermined for use in the event of the yaw control breaking.

Although that spring and centering rod system is effective, its return position is constant and therefore corresponds to a single flight setting only, and, in accordance with current procedures, it must be associated with a "refuge" speed. In other words, the pilot can no longer impose a yaw change of attitude on the aircraft, and yet the pilot must ensure that the aircraft is at an imposed speed on its trajectory (referred to as the "refuge" speed, i.e. a speed that is standardized for a given aircraft, e.g. equal to a maximum power speed).

By way of example, this can make it necessary to perform a landing with forward speed: the aircraft touches the ground while advancing at a certain speed. For a rotary wing aircraft that does not have a wheeled undercarriage, that will give rise, at best, to a "hard" landing.

Other approaches, such as that used on "Black Hawk" H60 aircraft, are substantially similar to that described above. Nevertheless, those approaches tend to increase the control forces that need to be applied to the manual flight control system, in particular while it is being controlled in normal mode. These forces need to be overcome both by a series actuator (similar to the subject matter of document FR 2 912 375) and by the parallel or "trim" actuator, so there is no possibility of piloting in the event of a linkage (cable) breaking, with only one equilibrium point between control force and control stroke, and with a given value for the return force.

BRIEF SUMMARY OF THE INVENTION

One of the main objects of the invention is to provide an aircraft control architecture that further increases safety in the event of at least one of the flight control systems breaking.

The invention must seek to maintain partial manual authority over the system after mechanical elements of the linkage have broken.

Furthermore, the invention seeks to avoid increasing the overall weight of the manual flight control system, and possibly even to reduce it, while nevertheless providing increased safety.

Naturally, adapting the invention to an existing aircraft must not give rise to large amounts of modification to its overall structure, and typically should avoid any need to adapt its automatic piloting relationships, where applicable. As far as possible, the invention seeks to provide novel or improved functions while using existing structures.

The invention also seeks to avoid increasing and even to decrease the forces the pilot needs to apply to actuate a manual flight control system (in normal operation), while still providing increased safety (in the event of breakage).

Finally, the invention seeks to mitigate the problems mentioned, while relying on the validity of existing safety analyses, i.e. without requiring major reworking of certifications.

The invention is defined by the claims.

For this purpose, the invention provides an emergency piloting method for a manual flight control system of an aircraft.

In the method, the manual flight control system is arranged to include from upstream to downstream, at least: a manual flight control device, intermediate mechanical connections for control transmission, and an airfoil surface for changing the flight attitude of the aircraft.

The method provides for at least one intermediate mechanical connection to be arranged to include a mechanical terminal transmission with an input pivoting quadrant upstream from the mechanical terminal transmission, an output pivoting quadrant downstream from the mechanical terminal transmission, and at least one flexible connection means (e.g. one or more cables).

The method provides for the flexible connection means to be arranged between the input pivoting quadrant and the output pivoting quadrant and for them to be connected together in such a manner as to transmit rotary control movements between the pivoting quadrants. In this manual flight control system that includes at least one centering rod, at least one series actuator is coupled (i.e. logically connected) to an electronic control unit for controlling the series actuator.

According to the method of the invention, said mechanical terminal transmission is arranged to include, downstream, at least one series actuator in parallel with at least one centering rod. Said output pivoting quadrant possesses at least two distinct off-center pivot hinges. One of them is an off-center hinge for transmitting control to said airfoil surface so that said airfoil surface is under the authority of the manual flight control system. The method provides for using this off-center control transmission hinge to connect said series actuator to the output pivoting quadrant. Another off-center hinge is for emergency centering, and it is arranged to connect said centering rod to the output pivoting quadrant.

In the event of said flexible connection means breaking, in this method, the upstream control device takes authority over the electronic control unit of the series actuator, while the output pivoting quadrant is subjected to centering action by said centering rod. As a result, the output pivoting quadrant forms a bearing point for said series actuator, and emergency piloting is transmitted from the upstream control device to the electronic control unit so as to actuate said series actuator and thereby enable said output pivoting quadrant to turn by a controlled amount, thereby achieving corresponding emergency actuation of the downstream airfoil surface.

The invention also provides a manual flight control system for an aircraft. This manual flight control system comprises from upstream to downstream, at least: a manual flight control device, intermediate mechanical connections for control transmission, and an airfoil surface for changing flight attitude of the aircraft.

At least one intermediate mechanical connection includes a mechanical terminal transmission, with an input pivoting quadrant upstream from the mechanical terminal transmission, an output pivoting quadrant downstream from the mechanical terminal transmission, and at least one flexible connection means.

The flexible connection means are arranged between the input pivoting quadrant and the output pivoting quadrant and are arranged to transmit rotary control movements between said pivoting quadrants. The manual flight control system includes at least one centering rod and at least one series actuator logically connected to an electronic control unit for controlling said series actuator.

According to the invention, said mechanical terminal transmission includes downstream at least one series actuator in parallel with at least one centering rod. Said output pivoting quadrant possesses at least two distinct off-center pivot hinges. One off-center hinge is for transmitting control to said airfoil surface under the authority of the manual flight control system. Said off-center hinge for transmitting control connects said series actuator to the output pivoting quadrant. Another off-center hinge is an emergency centering hinge that connects said centering rod to the output pivoting quadrant. A distal hinge of the manual flight control system connects said centering rod to a stationary structure of the aircraft longitudinally opposite from the output pivoting quadrant. Said output pivoting quadrant thus acts, in the event of said flexible connection means breaking, to form a bearing point for said series actuator, with said series actuator being subjected to the authority of emergency piloting from the manual flight control device via the electronic control unit.

As a result, the output pivoting quadrant forms firstly a bearing point for said series actuator, and emergency piloting is transmitted from the upstream control device to the electronic control unit so as to actuate said series actuator. Controlled rotation of said output pivoting quadrant is thus permitted, e.g. in the event of breakage of the mechanical terminal transmission, for the purpose of obtaining corresponding emergency actuation of the airfoil surface situated downstream.

In an embodiment of this manual flight control system, said mechanical terminal transmission includes, downstream: a single series actuator in parallel with a single centering rod. Said single series actuator is hinged directly firstly to the output pivoting quadrant and secondly to crank means leading to said airfoil surface. The single centering rod is hinged directly firstly to the output pivoting quadrant and secondly to a fixed structural pivot.

In another embodiment of this manual flight control system, said mechanical terminal transmission includes, downstream: at least one pair of series actuators, and interposed between the series actuators of a pair, a rocker having a middle pivot in a fixed location, each pair of series actuators being in parallel with at least one centering rod.

In an embodiment of the manual flight control system, said electronic control unit of the series actuator(s) downstream from the output quadrant is logically under the shared authority of an autopilot system and of said manual flight control device.

In an embodiment, the manual flight control system transmits piloting authority concerning a change in flight attitude of the aircraft in yaw, and said manual flight control device in the form of a pedal.

In this embodiment, the airfoil surface is in the form of an anti-torque tail rotor, or the like.

In an embodiment, the manual flight control system transmits piloting authority concerning a change of flight attitude of the aircraft in roll, and said manual flight control device is in the form of a cyclic stick.

In an embodiment, the manual flight control system transmits piloting authority over a change of flight attitude of the aircraft in pitching, and said manual flight control device is in the form of a cyclic stick.

In an embodiment, said manual flight control system includes power assistance downstream from said series actuator hinged to the output pivoting quadrant, the power assistance being in the form of a servo-control or the like interposed upstream from the airfoil surface under the authority of the manual flight control system and downstream from said output quadrant.

In an embodiment, the manual flight control system transmits piloting authority for a vertical change in the flight attitude of the aircraft, said manual flight control device being in the form of a collective lever.

In an embodiment, said manual flight control system includes a mixer upstream from said mechanical terminal transmission, the mixer being interposed between the manual flight control device and said input pivoting quadrant.

In an embodiment, said manual flight control system includes flexible connection means provided with two cables in parallel, each having an upstream end and a downstream end. An upstream of each of the two parallel cables of the flexible connection means is coupled (in normal operation) to the input pivoting quadrant, while a downstream end of each cable of the flexible connection means is coupled (in normal operation) to the output pivoting quadrant.

In an embodiment, in the mechanical terminal transmission of said manual flight control system, along a longitudinal axis (substantially between upstream and downstream), each series actuator in parallel with said centering rod is contiguous therewith at least in part, or else substantially colinear therewith.

The invention also provides an aircraft implementing the emergency piloting method and/or including one or more manual flight control systems as described above.

In the embodiment, the aircraft is a rotary wing aircraft.

In an embodiment of this aircraft, the airfoil surface is an anti-torque tail rotor, and the manual flight control system acts on a yaw flight attitude of the aircraft.

BRIEF DESCRIPTION OF THE SEVERAL VIEWS OF THE DRAWINGS

The invention and its advantages appear in greater detail in the following description of embodiments given by way of illustration and with reference to the accompanying figures, in which:

FIG. 1 is an exploded diagrammatic fragmentary view in perspective of an example rotary wing aircraft of the helicopter type having an anti-torque tail rotor and a single main lift and propulsion rotor, and a system for manual flight control in yaw that is provided with a known centering rod and spring mechanism;

FIG. 2 is a diagrammatic fragmentary view in perspective of a detail of the manual flight control system in yaw that was initially similar to that of FIG. 1 and that has been made to comply with a first embodiment of the invention, using a single series actuator in parallel with a single centering rod;

FIG. 3 is a fragmentary diagrammatic view in longitudinal elevation of a mechanical terminal transmission in a second embodiment of the invention, with a pair of series actuators, between which there is interposed in series a rocker with a middle pivot of fixed location, and with a single centering rod in parallel with said pair of series actuators;

FIG. 4 is a fragmentary diagrammatic view in plan from above showing the mechanical terminal transmission of the invention that is visible in FIG. 3, with its pair of series actuators (an upstream actuator on the left, a downstream actuator on the right), its fixed-pivot rocker, and its single centering rod in parallel; and FIG. 5 is a view similar to FIG. 4 showing a mechanical terminal transmission of the invention (the parallel series actuator(s) not being shown), with electrical detectors for detecting breakage of the linkage, installed on the output pivoting quadrant and suitable, in the event of breakage, for activating the spring-loaded centering lever.

Three mutually orthogonal axes X, Y, and Z are shown in the figures.

The axis X is said to be "longitudinal" and corresponds to the lengths or main dimensions of the structures described. Thus, the main component of air speed while in level flight or of thrust for causing the aircraft to advance is directed along this axis X.

In aviation, it is common for this axis X generally to designate the roll axis of an aircraft, when the aircraft is shown as a whole. Along this so-called "longitudinal" axis X, the upstream (forward) and downstream (rearward) directions are defined.

Another axis Y is said to be "transverse" and corresponds to the width or the lateral dimensions of the structures described. These longitudinal and transverse axes X and Y are sometimes said to be horizontal, for simplification purposes. For example, the distance from the fuselage of a propulsion arrangement is essentially measured along this Y axis.

In aviation, it is common practice for this Y axis to designate more generally the pitching axis of an aircraft. It is also along this axis Y that the terms "left" (when looking forwards) and "right" (when looking forwards) are defined, e.g. in order to distinguish between two half-wings or two propulsion arrangements.

A third axis Z is said to be in "elevation" and corresponds to the height dimensions of the structures described: the terms "up" and "down" are relative thereto. Sometimes this axis Z is said to be vertical.

In aviation, the Z axis generally designates the yaw axis of the aircraft. For simplification purposes, it is considered that the axis of rotation of the main rotor of a rotary wing aircraft extends substantially along the Z axis.

The X and Y axes together define a so-called "main" X, Y plane (that intersects linearly the plane of the sheet of FIG. 3 or that coincides with the plane of FIG. 4) within which, for an aircraft 1 of the kind shown in FIGS. 1 to 5, the support polygon is inscribed.

In the examples, the aircraft 1 is a helicopter having a rotary wing in the form of a main lift rotor 2 with a plurality of blades 3 (FIG. 1). The main rotor 2 is mounted on a mast 4 that serves in particular to drive it in rotation. A similar structure is to be found in Eurocopter Super Puma MKII, EC725 helicopters, for example.

In other examples, the aircraft 1 is a fixed-wing aircraft, in particular an airplane, a glider, or the like.

In flight, the blades 3 of such a main rotor 2 as shown in FIG. 1 describe a very flat cone, having a plane of rotation that is perpendicular to the general direction of the lift generated by the rotor, and to simplify is close to the elevation axis Z. This general lift of the main rotor 2 may then be resolved in a vertical lift force and a horizontal force that serves to drive the aircraft 1 forward (along its flight path).

It should be recalled that a cyclic pitch control for controlling the pitch of the blades of a main rotor of a rotary wing aircraft conventionally acts on the attitude of the aircraft about the X and Y axes, i.e. respectively in roll and in pitching.

The aircraft 1 of FIGS. 1 and 2 also possesses a tail anti-torque rotor 5 with blades 6. In FIG. 1, the aircraft 1 also possesses a plurality of manual flight control systems 7.

A manual flight control system 7 for transmitting movements from upstream to downstream comprises at least:

a manual flight control device 8 (at the upstream end, generally in a cockpit 9 and actuated by a pilot);

intermediate mechanical connections 10 for control transmission and referred to collectively as a "linkage"; and at the downstream end one or more airfoil surfaces 11 such as the blades 3 or 6 of the rotors 2 or 5.

Depending on the embodiment of the invention, an airfoil structure 11 may comprise one or more airfoil components selected from: rotor(s); wing(s); aileron(s); flap(s); fin(s); stabilizer(s); rudder(s); or indeed turbine(s); thruster(s); or the like.

Conventionally, two systems 7 are provided: a roll and pitching system for controlling the cyclic pitch of the blades of said main rotor 2, and an altitude-change system by controlling the collective pitch of the blades of the main rotor 2.

In particular, a manual flight control system 7 controls the shape and the angle of inclination of said cone of the main rotor 2 relative to a specific frame of reference associated with the aircraft.

In order to control the general lift of the main rotor 2, in magnitude and in direction, the pilot generally acts on the value of the pitch angle of each blade 3 by causing the blade 3 to pivot about its longitudinal pitch axis. Thus, when the pilot causes pitch to vary collectively, i.e. pitch of all of the blades 3 of the main rotor 2 to vary in identical manner, then the magnitude of the general lift from the main rotor 2 varies in such a manner as to control the altitude of the aircraft 1.

In contrast, varying the collective pitch of the blades 3 has no effect on the axis along which the general lift is directed. In order to modify the axis of the general lift generated by the main rotor 2, it is appropriate to tilt said cone by causing pitch to vary in a manner that is not collective, but rather that is cyclic. Under such circumstances, the pitch of a blade 3 varies as a function of its azimuth, and during one complete revolution it passes from a maximum value to a minimum value and back again. These maximum and minimum values are obtained respectively at opposite azimuth values.

Two manual flight control systems 7 connect two manual control devices 8 to the blades 3 of the main rotor 2. In general, a first manual flight control system 7 acts on the cyclic pitch of the blades 3 of the main rotor 2 so as to cause the flight attitude in roll and in pitch to change by acting on a manual flight control device 8 referred to as the "cyclic stick" 12.

Another manual flight control system 7 acts on the collective pitching of the blades 3 in order to change the vertical flight attitude of the aircraft 1 by acting on a manual flight control device 8 referred to as a "collective pitch lever" or a "collective lever", referenced 13, and for the purpose of causing the aircraft 1 to climb or to descend.

In FIG. 1, in addition to the controls delivered by a manual flight control device 8 dedicated to a given attitude change (e.g. in pitching, in roll, or in yaw), other imposed flight parameters of the aircraft (or structural parameters) are taken into account by a mixer unit 14.

Such a mixer unit 14 is arranged within a manual flight control system 7 and gives rise to changes of attitude other than those requested by using the dedicated manual flight control device 8 (cyclic stick 12 or collective lever 13, or indeed pedals 15). The mixer unit 14 serves in particular to enable the collective pitch and cyclic pitch controls to operate independently of each other without interactions between them.

In FIG. 1, the manual flight control devices 8 are duplicated, each stick 12, lever 13, or set of pedals 15 being duplicated on the right and left sides.

In any event, a manual flight control system 7 dedicated to changing flight attitude in yaw is actuated by the pilot using one or other of the pedals 15, thereby giving rise to attitude changes that are initiated by the pilot. Conventionally, the pedals 15 act on the anti-torque rotor 5, commonly referred to as the "tail" rotor.

In FIG. 1, in the dedicated manual flight control system 7, there can be seen an intermediate mechanical connection 10 with the primary roll and pitching linkages connecting the cyclic stick 12 to the mixer unit 14. The mixer unit 14 is connected to the main rotor 2 via (cyclic) secondary linkages. Furthermore, the collective lever 13 is connected to said mixer unit 14 via a distinct (collective) primary linkage.

As described below, a given manual flight control system 7 (for roll, pitching, or collective control) is connected to its dedicated airfoil surfaces 11 (e.g. blades 3 of the rotor 2 or blades of the rotor 5), successively via a primary linkage and then via a secondary linkage.

A movement of the cyclic stick 12 causes the primary roll or pitching linkage to move and consequently causes the corresponding secondary linkage(s) to move via the mixer unit 14.

In other words, an intermediate mechanical connection 10 includes at its upstream end at least one primary linkage, and at its downstream end at least one secondary linkage connected to said primary linkage.

It can thus be seen that the secondary linkage, downstream from the mixer unit 14 and extending as far as the airfoil surfaces 11 that are to be controlled, i.e. the blades 6 of the rotor 5, includes a so-called "mechanical terminal transmission" section 23 that extends downstream between an input pivoting quadrant 24 and the airfoil surfaces 11 that are to be controlled.

Similarly to a movement of the cyclic stick 12 causing roll or pitching movement, a movement of the collective lever 13 causes the collective primary linkage to move and then the secondary linkages, via the mixer unit 14.

In FIGS. 1 and 2, power assistance 16 is in the form of a servo-control in each of the secondary linkages.

For example, in a lightweight helicopter, power assistance 16 (or servo-control) is provided for piloting in pitching and is referred to as the "pitching servo-control" for convenience, together with dual power assistance 16 referred to as "left and right roll servo-control" for providing roll control.

Consequently, in order to modify the collective pitch of the blades 3 of the main rotor 2, the pilot moves the collective pitch lever 13 that acts on the main rotor 2 via this triple power assistance 16 (e.g. three servo-controls).

In contrast, so as to vary the cyclic pitch of the blades 3 in order to direct the aircraft 1 in a given direction, the pilot causes power assistance 16 (at least one servo-control) to move by tilting the cyclic pitch 12 accordingly, and in the desired direction.

As shown in FIG. 1, for heavy helicopters, a manual flight control system 7 includes a phasing unit 17 capable of changing phase.

Since the aircraft 1 in FIG. 1 is a helicopter with an anti-torque rotor 5, the manual flight control system 7 in yaw comprises pedals 15 that act as the yaw control device 8. The pedals 15 are dedicated to yaw control and connected via the intermediate mechanical connection 10 in yaw to the tail rotor 5 via primary and secondary linkages and via the mixer unit 14.

It should also be observed that the aircraft 1 in FIG. 1 possesses a yaw damper 18, collective/yaw coupling 19, and various deflector means 20 (including bell cranks or the like).

In FIG. 1 there can be seen a series actuator 21 (also known as a SEMA) and a spring-loaded centering rod 22.

Embodiments of the invention are described below.

Although the embodiments relate to yaw controls for a helicopter, the invention naturally applies firstly to other types of flight attitude changing controls (roll, pitching, . . . ), and also to other intended types of aircraft (airplanes, gliders, etc.).

In FIG. 2, elements having functions similar to those of elements described with reference to FIG. 1 (e.g. known attitude controls) are designated by the same numerical references).

In FIG. 2, the manual flight control system 7 for yaw, otherwise similar to that of FIG. 1, shows in this first embodiment of the invention a single series actuator 21, connected in parallel with a single spring-loaded centering rod 22, both of them being within the mechanical terminal transmission 23.

This single series actuator 21 and this single spring-loaded centering rod 22 are arranged in parallel with each other. The single series actuator 21 and the single centering rod 22 are mounted within an intermediate mechanical connection 10 for yaw, towards the downstream end of the manual flight control 7 for yaw, i.e. in a downstream end portion of the connection 10, which downstream portion is referred to as the "mechanical terminal transmission" 23.

This manual flight control system 7 in yaw in accordance with the invention comprises from upstream to downstream: its manual flight control device 8 in the from of pedals 15, intermediate mechanical connections 10 including the mechanical terminal transmission 23 downstream from a secondary linkage, and airfoil surfaces for changing the flight attitudes in yaw of the aircraft 1, specifically the blades 6 of the anti-torque rotor 5.

The yaw mechanical terminal transmission 23 of the corresponding intermediate mechanical connection 10 conventionally comprises an input pivoting quadrant 24 at the upstream end of the mechanical terminal transmission 23, an output pivoting quadrant 25 further downstream in said transmission 23, and at least one flexible connection means 26, here in the form of a pair of cables 27 and 28 between the input and output pivoting quadrants 24 and 25.

As in FIG. 1, the flexible connection means 26 are arranged between the input pivoting quadrant 24 and the output pivoting quadrant 25, in order to couple them together in pivoting. These flexible connection means 26 connect the input pivoting quadrant 24 mechanically to the output pivoting quadrant 25 in such a manner as to transmit control pivoting movements from one of them to the other, and vice versa.

As mentioned above, a manual flight control system 7 commonly possesses at least one series actuator 21, e.g. upstream from the input pivoting quadrant 24, and thus external to the mechanical terminal transmission 23. Under such circumstances, such a manual flight control system 7 includes an electronic control unit 29 for controlling the series actuator 21.

In general, one such electronic control unit 29 is logically connected to each series actuator 21 in order to control its motor-driven extensions and contractions.

In order to illustrate an embodiment of such a series actuator 21, it may be an electromechanical actuator that possesses integrated electronics and known by the initials SEMA. Often such a series actuator 21 has electronics for receiving numerical setpoints (Arinc 429 messages) and is capable of moving very quickly through a small amplitude. Such series actuators 21 are used in autopilot flight control mechanisms as electromechanical actuators for making use of data from an autopilot computer in order to perform guidance functions while acting on the flight controls of the helicopter.

For further details, reference may be made to: http://en.wikipedia.org/w/index.php?title=Linear_actuator&printable=yes or indeed http://www.sagem-ds.com/spip.php?rubrique246&lang=fr Contrary to the invention, in FIG. 1, the series actuator 21 that is placed outside the mechanical terminal transmission 23, upstream from the flexible connection means 26 is coupled to the input pivoting quadrant 24 and drives it directly in pivoting without passing via flexible connection means 26. The single series actuator 21 in FIG. 2 and in accordance with the invention is not coupled to the input pivoting quadrant 24, although it still naturally depends on the same general movement system 7, this system 7 being a kinematic linkage i.e. an operating mechanism.

This is what distinguishes the invention, where said mechanical terminal transmission 23 includes towards its downstream end at least one series actuator 21 in parallel with at least one centering rod 22, at least one of the series actuator 21 and the centering rod 22 being hinged to and thus directly coupled to the output pivoting quadrant 25.

Under such circumstances, said output pivoting quadrant 25 possesses at least two distinct off-center pivot hinges 30.

One of them is an off-center hinge 30 for transmitting a control signal to said airfoil surface 11 for changing flight attitude, under the authority of the corresponding manual flight control system 7. In FIG. 2, this off-center control transmission hinge 30 connects said series actuator 21 mechanically to the output pivoting quadrant 25 so as to enable movements to be transmitted between them by extending or contracting said single series actuator 21.

By means of this off-center transmission hinge 30, during "emergency piloting" after a portion of the corresponding manual flight control system 7 has broken, it is made possible to perform manual flight control movements of the airfoil surfaces 11, here yaw airfoil surfaces, by means of the hinge 30.

These movements are initiated by the corresponding manual flight control device 8 (e.g. pedals 15) and relayed by the electronic control unit 29. This electronic control unit 29 may then cause the single series actuator 21 to perform extension or contraction movements.

The other off-center hinge 30 is said to be an "emergency centering" hinge and it connects said centering rod 22 mechanically to the output pivoting quadrant 25.

In normal operation, this mechanical connection between the rod 22 and the quadrant 25 enables the centering rod 22 to accompany the movements of the quadrant 25.

Furthermore, in "emergency piloting" mode after a break in a portion of the corresponding manual flight control system 7 and after blocking of the rod 22, this connection ensures that this output pivoting quadrant 25 is held stationary and centered.

This is a result made possible by the fact that the single centering rod 22 is hinged directly to a stationary pivot 31 of the structure at its end opposite from the output pivoting quadrant 25. Such a stationary pivot 31 is rigidly secured to the structure of the aircraft, so as to provide the centering rod 22 with a fixed bearing point.

As a result, in the event of a portion of the flexible connection means 26 breaking, typically a cable 27-28 breaking, the invention ensures that the upstream control device 8 transmits authority over the electronic control unit 29 for controlling the series actuator 21 situated within the mechanical terminal transmission 23.

However, the output pivoting quadrant 25 is subjected by said centering rod 22 to blocking that holds it in a predetermined stable position. By being placed in this way in a stable centering state, i.e. by being prevented from pivoting, this output pivoting quadrant 25 forms a fixed bearing point for the off-center transmission hinge 30 and thus for the series actuator 21.

As explained above, the series actuator 21 of the mechanical terminal transmission 23 has one end (remote from its end that is hinged to the output pivoting quadrant 25) that is mechanically connected to crank means 20 going downstream and thus to the airfoil surfaces 11 (blades 6) for changing flight attitude on which it is desired to act in spite of the break.

This mechanical connection between the downstream end of the series actuator 21 and said crank means 20 is such that contractions/extensions of this series actuator 21 can be used in an emergency to pivot the crank means 20. Control movements are thus transmitted to the airfoil surfaces 11 (blade 6) via the crank means 20.

A motor-driven extension initiated by the electronic control unit 29 causes the crank means 20 to pivot in a given direction (e.g. clockwise). A motor-driven contraction initiated by the electronic control unit 29 causes pivoting in the opposite direction (e.g. counterclockwise) of the crank means 20.

Depending on the direction of rotation, the corresponding airfoil surfaces 11 are themselves moved in one direction or in the opposite direction.

This enables emergency piloting to be transmitted from the upstream control device 8 to the electronic control unit 29 in such a manner as to actuate said series actuator 21 and the corresponding airfoil surfaces 11.

It should be recalled that the invention applies to a variety of manual flight control systems 7, in particular those acting on a single airfoil surface 11 or acting on some other flight attitude, such as rolling, pitching, braking, or the like.

FIGS. 3 and 4 show another embodiment of the manual flight control system 7 in yaw of the invention.

In this manual flight control system 7, the mechanical terminal transmission 23 includes at its downstream end two series actuators 21 that are paired in a series connection. In FIG. 4, there can be seen toward the top and to the left an "upstream-top" (or "upstream/right-starboard") series actuator 21, and towards the bottom and to the right a "downstream-bottom" series actuator 21. These "upstream-top" and "downstream-bottom" (or "downstream/left-part") series actuators 21 form an end-to-end pair.

This pair of series actuators 21 is arranged in parallel with a single spring-loaded centering rod 22. Between the series actuators 21 of the pair, there is arranged a rocker 32 with a middle pivot at a fixed location. The pair of series actuators 21 is thus connected end-to-end indirectly, and forms a series connection in which actuating of one of the series actuators 21 in the pair acts on the other one of the series actuators 21.

Like the spring-loaded centering rod 22 which in this example is likewise hinged on a fixed structural pivot 31 close to the crank means 10 of the mechanical terminal transmission 23, the rocker 32 having a middle pivot in a fixed location is hinged to a fixed structural pin 33.

In FIG. 4, it can clearly be seen that this fixed structural pin 33 is rigidly mounted on a structural cross-member 34, itself rigidly secured to the fuselage of the aircraft 1, here to a segment of its tail boom. The fixed structural pin 33 is thus incorporated in a tail boom of the aircraft 1 and is substantially centered relative to the transverse axis Y.

In this embodiment of the invention, a break in the linkage gives rise to the following events. Firstly, once the break has been detected, the spring-loaded centering rod 22 stiffens and holds the output pivoting quadrant 25 stationary.

This forms the bearing point for the upstream-top (i.e. "upstream/right-starboard") series actuator 21 that can receive flight attitude changing instructions via the electronic control unit 29, which instructions are derived from the manual flight control device 8 (one of the pedals 15 for yaw). The same applies to the downstream-bottom or "downstream/left-part") series actuator 21.

These instructions can cause the actuators in the pair of series actuators 21 either to extend, or to contract, or to be blocked against moving.

In FIG. 4, an extension of the upstream-top series actuator 21 pushes a top branch 35 of the rocker 32 having a fixed pivot towards the right. Since this rocker 32 is undeformable and is mounted to pivot on a fixed pin 33, this causes a bottom branch 36 of the rocker to move to the left.

It should be observed that the end of the upstream-top series actuator 21 that is remote from the output pivoting quadrant 25 is hinged to the top branch 35 at a transverse distance from the fixed pin 33, thereby forming a lever arm. The downstream-bottom series actuator 21 has its end remote from the crank means 20 hinged to the bottom branch 36 at a transverse distance from the fixed pin 33, thereby forming another lever arm.

This extension movement pulls the downstream-bottom series actuator 21 to the left. Under the authority of the electronic control unit 29, this downstream-bottom series actuator 21 is simultaneously subjected to retraction that is additional to the extension of the upstream-top series actuator 21.

This end-to-end duplication of the series actuators 21 is advantageous when the fast but small amplitude movements of the "SEMA" actuators that are being used are insufficient compared with the strokes desired for the crank means 20 of the mechanical terminal transmission 23 and thus for the airfoil surface(s) 11 needing to be piloted in an emergency situation.

Conversely, contraction of the upstream-top series actuator 21 in FIG. 4 pulls the top branch 35 of the rocker 32 to the left. Since this rocker 32 is undeformable and is mounted to pivot on the fixed pin 33, this causes the bottom branch 36 to move to the right. This movement pushes the downstream-bottom series actuator 21 towards the right. Under the authority of the electronic control unit 29, this downstream-bottom series actuator 21 is subjected simultaneously to an extension.

In order to cause the corresponding airfoil surface 11 to move in one direction, the manual flight control device 8 communicates with the electronic control unit 29, which in turn causes the series actuators 21 to extend or to contract or to be locked (stationary).

In this embodiment of the manual flight control system 7, said electronic control unit 29 for the series actuator(s) 21 downstream from the output pivoting quadrant 25 is, from a logical point of view, under authority that is shared between an autopilot system (e.g. AFCS, also referenced 29) and of said manual flight control device 8.

In FIG. 4, the manual flight control system 7 transmits piloting authority concerning a change of the flight attitude of the aircraft 1 in yaw from said manual flight control device 8, specifically a pedal 15, in order to act on the airfoil surfaces 11 in the form of blades 6 of the anti-torque tail rotor 5.

In other embodiments, the manual flight control system 7 in accordance with the invention transmits piloting authority concerning a change in the flight attitude of the aircraft 1 in roll, said manual flight control device 8 then being in the form of the cyclic stick 12. Likewise, for emergency piloting in pitching in accordance with the invention, the manual flight control device 8 is in the form of the cyclic stick 12.

FIG. 2 shows that the manual flight control system 7 includes power assistance 16 downstream from the series actuator 21 hinged to the output pivoting quadrant 25, which power assistance may be in the form of a servo-control or the like. This power assistance 16 is interposed upstream from the airfoil surface 11 that is to be controlled under the authority of the manual flight control system, and downstream from said output control quadrant 25.

Similarly, in FIG. 2, in the mechanical terminal transmission 23 downstream from the series actuators 21, power assistance 16 in the form of a servo-control is interposed upstream from the airfoil surface 11.

In the embodiment of FIG. 2, the yaw manual flight control system 7 includes a mixer unit 14 upstream from the mechanical terminal transmission 23, which mixer unit 14 is interposed between the manual flight control device 8 and said input pivoting quadrant 24.

In FIGS. 2 to 5, the flexible connection means are provided by two cables in parallel, each having an upstream end a downstream end.

As can be seen clearly from FIGS. 2 to 5, a downstream end 37 of each of the two parallel cables (of the flexible connection means 26) is coupled in normal operation to an output pivoting quadrant 25. In FIG. 2, an upstream end 38 of each of the two cables of the flexible connection means 26 is coupled in normal operation to the input pivoting quadrant 24.

In order to reduce the size of the mechanical terminal transmission 23, in particular along the longitudinal axis X substantially between upstream and downstream, each of the series actuators 21 in parallel with said centering rod 22 is contiguous with the other actuator 21, at least in part. In certain embodiments, these series actuators 21 are substantially colinear, e.g. to be received in a small amount of space available perpendicularly to the longitudinal axis X.

DETAILED DESCRIPTION OF THE INVENTION

By means of the invention, it is thus possible to obtain an aircraft 1 that implements the emergency piloting method and/or that includes one or more manual flight control systems 7 as described above, regardless of whether the aircraft 1 is a rotary wing aircraft.

The invention thus proposes a novel and non-obvious use of one or more series actuators 21 in the event of flight controls breaking as emergency piloting means.

A flight control breaking can sometimes lead to the aircraft 1 being lost. Certain systems (e.g. the yaw system) may be fitted with a centering rod 22, e.g. upstream from the input quadrant 24. Thus, in the event of a break, it is possible to lock the position of the rudder automatically, e.g. the anti-torque rotor 5 for the yaw system 7, in a predetermined position after the controls have broken.

Nevertheless, the predetermined return position corresponds to a single flight setting associated with a refuge speed. This may make it necessary to land with forward speed. The invention makes it possible to propose an architecture that increases safety in the event of a manual flight control system 7 breaking. The proposed architecture makes it possible to maintain partial authority over the system, even after mechanical elements have broken.

A manual flight control system is sometimes vulnerable because of its length. Known systems that enable a certain level of safety to be maintained after an element in a control system has broken have limits, as mentioned above.

The invention does not increase the forces in the manual flight control system 7 while the system is being operated in nominal mode. The invention provides a range of choices to a pilot in an emergency situation concerning settings for balanced flight, thereby making it possible to reduce the risk of needing to land with forward speed.

Using the invention, it is possible for the series actuator(s) 21 (having the function in normal operation of providing stabilization) to be situated directly upstream from the power assistance 16 (e.g. a servo-control) for providing the pilot with limited control over said system after the flight control system has broken. This enables the safety of the aircraft 1 to be increased without penalizing its weight or its complexity.

The series actuators 21 are controlled by an electronic control unit 29 that may be pre-existing, such as the autopilot computer, which computer already has the capacity to cause the actuators to lengthen, to retract, or to be locked. Depending on the variations in length (elongation and/or retraction) in the series actuator(s) 21, the invention makes it possible to control a power assistance valve (e.g. a servo-control) i.e. act as a dispatcher and thus to vary the pitch of the blades 6 of the rotor 5 (or the like). The control device 8 (stick 12, lever 13, pedals 15) in the cockpit represents the upstream end of the system. The crank means 20 at the input to the power assistance 16 (servo-control) and the airfoil surface 11 that depends therefrom represent the downstream end of the control system 7.

Since it is desired for a variation in the length of the series actuator 21 to give rise to a movement in the crank means 20 at the input to the power assistance 16 (e.g. servo-control), the series actuator(s) 21 of the invention will see greater friction upstream than downstream. That is why, particularly downstream, the invention arranges for friction within the manual flight control system 7 to be as small as possible. The upstream anchoring of the series actuators 21 is very often performed by parallel actuators (not shown and known as trim actuators).

If the series actuators 21 are located downstream from the centering rod 22, they are thus anchored by the rod 22, in addition to friction and an upstream parallel actuator.

In the event of the control system 7 breaking, even if there is no longer a mechanical connection between the upstream parallel actuator and the series actuators 21, the series actuators 21 can continue to operate (since they remain anchored by the centering rod 22). For this purpose, the electrical connection (power supply, control) is maintained.

In FIGS. 3 and 4, series actuators 21 are mounted on either side of a rocker 32. Upstream, the series actuators 21 are connected to a sector of the output pivoting quadrant 25. A resilient centering rod 22 is connected at one of its ends to said sector of the output pivoting quadrant 25 and at its other end to the structure of the aircraft 1. Downstream, the series actuators 21 are connected to crank means 20 connected via a last control cam or lever 39 to the input of the servo-control.

In normal operation, the series actuators 21 are anchored upstream by the parallel yaw actuator because of the friction of the yaw system 7 situated upstream from the series actuators 21, and by the return force from the centering rod 22. Downstream, the series actuators 21 see only forces that are very small (crank plus rod plus servo-control input lever).

After a break in the manual flight control system 7 upstream from the output quadrant 25, e.g. a break in the cables, the centering rod 22 automatically takes up a predetermined so-called "return" position under the effect of opposing springs. In addition to the fact that the series actuators 21 are anchored at their upstream end on this position, the invention presents the advantage of defining a reference position for the autopilot system (AFCS or the like).

Under the effect of the control being recentered towards the return position, a yaw movement will be started that will be damped automatically by the series actuators 21 operating in the opposite direction, e.g. by lengthening. The function of the autopilot is to compensate for any disturbance induced in the flight parameters (here angular speed in yaw), regardless of whether the disturbance is external (gust of wind) or internal (recentering by the centering rod, for example). Thus, the autopilot system (AFCS, etc.) will continue to implement its targets (steady ball indicator in cruising flight, steady heading while hovering) while damping parasitic movements, within the limit of the authority given to its series actuators 21.

The invention thus makes it possible, in cruising flight, for the pilot to stay aligned on a given heading, and to decelerate along that heading until landing while hovering.

There is no need for any modification to the piloting relationships nor is there any need for an additional sensor.

A variant is shown in FIG. 5, referred to as a "flight controls" variant, in which a transparent return is provided for the output pivoting quadrant 25 in normal operation. Thus, if the flexible connection means 26 comprise a pair of cables, these are subjected to a certain amount of mechanical tension.

This variant of the manual flight control system 7 of the invention is automatically engaged in the event of the cables of the flexible connection means 26 breaking. For this purpose, a detector 40 that senses the normal tension is mounted in association with the output pivoting quadrant 25 in order to monitor the state of the downstream ends 37 of the cables of the flexible connection means 26.

One of the numerous advantages of the invention is to make limited piloting possible after a flight control system has broken. Indeed, the elements needed are pre-existing elements. Furthermore, architectures already exist with series actuators 21 downstream from main abutments, for which safety analyses have already been undertaken. Furthermore, there is no need to adapt the piloting relationships (of the AFCS system) when providing a software implementation of a manual flight control system 7 of the invention.

From the point of view of piloting a helicopter, the autopilot damps the transient at the time of the breakdown, where appropriate, and thus considerably increases the safety margins during the breakdown transient while landing after the breakdown.

Nevertheless, the invention is not limited to the embodiments described. On the contrary, the invention covers any equivalent of the characteristics described.

What is claimed is:

1. An emergency piloting method for a manual flight control system of an aircraft, the manual flight control system being arranged to include from upstream to downstream, at least: a manual flight control device, intermediate mechanical connections for control transmission, and an airfoil surface for changing the flight attitude of the aircraft; the method providing at least one intermediate mechanical connection that is arranged to include a mechanical terminal transmission with an input pivoting quadrant upstream therefrom, at its upstream end, an output pivoting quadrant at its downstream end, and at least one flexible connection means, and that is arranged for said manual flight control system that includes at least one centering rod to be provided with at least one series actuator coupled to an electronic control unit, wherein said mechanical terminal transmission is arranged to include towards the downstream end, at least one series actuator in parallel with at least one centering rod, said output pivoting quadrant possessing at least two distinct off-center pivoting hinges; one of these hinges being an off-center hinge for transmitting control to said airfoil surface so that said airfoil surface is under the authority of said system, the method making provision for using said off-center control transmission hinge to connect said series actuator to the output pivoting quadrant, while another off-center hinge, which is an emergency centering hinge is arranged to connect said centering rod to the output pivoting quadrant; and wherein in the event of a breakage of said flexible connection means, the upstream control device takes authority over the electronic control unit of the series actuator, while the output pivoting quadrant is subjected by said centering rod to a centering action, such that said output pivoting quadrant forms a bearing point for the series actuator, and emergency control is transmitted from the control device to the electronic control unit in such a manner as to actuate the airfoil surface downstream.

2. A manual flight control system for an aircraft, said manual flight control system comprising from upstream to downstream, at least: a manual flight control device, intermediate mechanical connections for control transmission, and an airfoil surface for changing flight attitude of the aircraft, at least one intermediate mechanical connection including a mechanical terminal transmission, with: an upstream input pivoting quadrant, a downstream output pivoting quadrant, and at least one flexible connection means, the flexible connection means being arranged between the input pivoting quadrant and the output pivoting quadrant and being arranged to transmit rotary control movements between said pivoting quadrants, the manual flight control system including at least one centering rod and at least one series actuator logically connected to an electronic control unit for said series actuator, wherein said mechanical terminal transmission includes downstream at least one series actuator in parallel with at least one centering rod, said output pivoting quadrant possessing at least two distinct off-center pivot hinges: one off-center hinge for transmitting control to said airfoil surface under the authority of the manual flight control system, said off-center hinge for transmitting control connecting said series actuator to the output pivoting quadrant, another off-center hinge being an emergency centering hinge that connects said centering rod to the output pivoting quadrant, a hinge remote from the manual flight control system connecting said centering rod to a fixed structure of the aircraft to be equipped with this system longitudinally opposite from the output pivoting quadrant, said output pivoting quadrant thus acting, in the event of said flexible connection means breaking, to form a bearing point for said series actuator, with said series actuator being subjected to the authority of the manual flight control device via the electronic control unit.

3. A manual flight control system according to claim 2, wherein said mechanical terminal transmission includes, downstream: a single series actuator in parallel with a single centering rod, said single series actuator being hinged directly firstly to the output pivoting quadrant and secondly to crank means leading to said airfoil surface, the single centering rod being hinged directly firstly to the output pivoting quadrant and secondly to a fixed structural pivot.

4. A manual flight control system according to claim 2, wherein said mechanical terminal transmission includes, downstream: at least one pair of series actuators, and interposed between the series actuators of a pair, a rocker having a middle pivot in a fixed location, each pair of series actuators being in parallel with at least one centering rod.

5. A manual flight control system according to claim 2, wherein said electronic control unit of the series actuator(s) downstream from the output quadrant is logically under the shared authority of an autopilot system and of said manual flight control device.

6. A manual flight control system according to claim 2, wherein the manual flight control system transmits piloting authority concerning a change in flight attitude of the aircraft in yaw, and said manual flight control device in the form of a pedal.

7. A manual flight control system according to claim 6, wherein the airfoil surface is in the form of blades of an anti-torque tail rotor.

8. A manual flight control system according to claim 2, wherein the manual flight control system transmits piloting authority concerning a change of flight attitude of the aircraft in roll, and said manual flight control device is in the form of a cyclic stick.

9. A manual flight control system according to claim 2, wherein said manual flight control system transmits piloting authority over a change of flight attitude of the aircraft in pitching, and said manual flight control device is in the form of a cyclic stick.

10. A manual flight control system according to claim 2, wherein said manual flight control system includes power assistance downstream from said series actuator hinged to the output pivoting quadrant, the power assistance being in the form of a servo-control or the like interposed upstream from the airfoil surface under the authority of the manual flight control system and downstream from said output quadrant.

11. A manual flight control system according to claim 2, wherein said manual flight control system includes a mixer upstream from said mechanical terminal transmission, the mixer being interposed between the manual flight control device and said input pivoting quadrant.

12. A manual flight control system according to claim 2, wherein the manual flight control system includes flexible connection means provided with two cables in parallel, each having an upstream end and a downstream end, an upstream of each of the two parallel cables being coupled to the input pivoting quadrant while a downstream end of each cable of the flexible connection means is coupled in normal operation to the output pivoting quadrant.

13. A manual flight control system according to claim 2, wherein in the mechanical terminal transmission along a longitudinal axis (X) each series actuator in parallel with said centering rod is at least in part contiguous or substantially colinear with said centering rod.

14. An aircraft implementing the method according to claim 1, wherein the aircraft is a rotary wing aircraft.

15. An aircraft according to claim 14, wherein the airfoil surface is an anti-torque tail rotor, and the manual flight control system acts on a flight attitude of the aircraft in yaw.

16. An aircraft including one or more manual flight control systems according to claim 2, wherein the aircraft is a rotary wing aircraft.

17. An aircraft according to claim 16, wherein the airfoil surface is an anti-torque tail rotor, and the manual flight control system acts on a flight attitude of the aircraft (1) in yaw.

* * * * *